(12) United States Patent
Schultz et al.

(10) Patent No.: US 11,920,536 B1
(45) Date of Patent: Mar. 5, 2024

(54) FUEL PUMP WITH ELECTRONIC CONTROLLED PRESSURE REGULATION AND FAILURE MITIGATION

(71) Applicants: Gary Schultz, Carlsbad, CA (US); Conrad P. Lindberg, Fallbrook, CA (US); Charles Duffie, Pinecrest, FL (US)

(72) Inventors: Gary Schultz, Carlsbad, CA (US); Conrad P. Lindberg, Fallbrook, CA (US); Charles Duffie, Pinecrest, FL (US)

( * ) Notice: Subject to any disclaimer, the term of this patent is extended or adjusted under 35 U.S.C. 154(b) by 0 days.

(21) Appl. No.: 17/746,709

(22) Filed: May 17, 2022

Related U.S. Application Data

(60) Provisional application No. 63/189,576, filed on May 17, 2021.

(51) Int. Cl.
*F02D 41/22* (2006.01)
*F02D 41/30* (2006.01)
(Continued)

(52) U.S. Cl.
CPC ......... *F02D 41/222* (2013.01); *F02D 41/221* (2013.01); *F02D 41/3082* (2013.01); *F02C 7/236* (2013.01); *F02C 9/30* (2013.01); *F02D 2041/223* (2013.01); *F02D 2041/226* (2013.01); *F02D 2041/228* (2013.01); *F02D 2200/0602* (2013.01); *F02D 2200/50* (2013.01)

(58) Field of Classification Search
CPC .......... F02C 7/236; F02C 9/30; F02D 41/221; F02D 41/222; F02D 41/3082;
(Continued)

(56) References Cited

U.S. PATENT DOCUMENTS

| 4,276,602 A | 6/1981 | Obara et al. |
| 4,305,364 A | 12/1981 | Stuckas |

(Continued)

FOREIGN PATENT DOCUMENTS

| JP | S62135660 A | * | 6/1987 |
| JP | 2004028038 A | * | 1/2004 |
| RU | 2530485 C1 | * | 10/2014 |

OTHER PUBLICATIONS

Takeda, JP S62-135660, full length human translation. (Year: 1987).*

*Primary Examiner* — Hung Q Nguyen
*Assistant Examiner* — Mark L. Greene
(74) *Attorney, Agent, or Firm* — Betsy Kingsbury Dowd; BKDowd Law, P.C.

(57) ABSTRACT

A fuel pump system for aircraft includes an auxiliary fuel pump in-line with the primary pump, and an electric motor driving the auxiliary fuel pump at an operational motor speed. The system includes an electric control circuit (ECC) and a pressure sensor to regulate the speed of the electric motor based on the output pressure from the sensor to maintain a constant predetermined output pressure. The system may have additional fault mitigation circuitry configured to automatically switch from a processor-controlled to a fixed voltage as a source of power driving the electric motor at either a regulated speed or a constant fixed speed, respectively. The system may include a switch having user-selectable operational modes, including ECC-controlled mode and a high boost mode selectable if the ECC fails. In high boost mode, the ECC is bypassed to drive the electric motor at a fixed safe speed.

23 Claims, 4 Drawing Sheets

(51) Int. Cl.
*F02C 7/236* (2006.01)
*F02C 9/30* (2006.01)

(58) Field of Classification Search
CPC ......... F02D 2041/223; F02D 2041/226; F02D 2041/228; F02D 2200/0602; F02D 2200/50
See application file for complete search history.

(56) References Cited

U.S. PATENT DOCUMENTS

| | | | |
|---|---|---|---|
| 5,055,758 A | | 10/1991 | Hock |
| 5,083,544 A | * | 1/1992 | Brighigna ............ F02M 59/442 |
| | | | 123/507 |
| 5,411,002 A | * | 5/1995 | Smitley .................. F02M 37/08 |
| | | | 123/497 |
| 6,056,008 A | | 5/2000 | Adams et al. |
| 6,178,997 B1 | | 1/2001 | Adams et al. |
| 7,174,249 B2 | | 2/2007 | Bryan et al. |
| 7,263,978 B2 | | 9/2007 | York et al. |
| 7,265,516 B2 | * | 9/2007 | LaCroix .................. H02P 29/02 |
| | | | 318/812 |
| 7,412,968 B2 | * | 8/2008 | Takayanagi ......... F02D 41/3863 |
| | | | 123/456 |
| 9,279,404 B2 | * | 3/2016 | Aoki .................. F02M 63/0245 |
| 10,054,076 B1 | | 8/2018 | McFarland |
| 10,077,769 B2 | | 9/2018 | Giacaman |
| 2004/0260425 A1 | | 12/2004 | Giacaman |
| 2005/0058549 A1 | | 3/2005 | York et al. |
| 2006/0200300 A1 | | 9/2006 | Bryan et al. |
| 2018/0223765 A1 | | 8/2018 | McFarland |

* cited by examiner

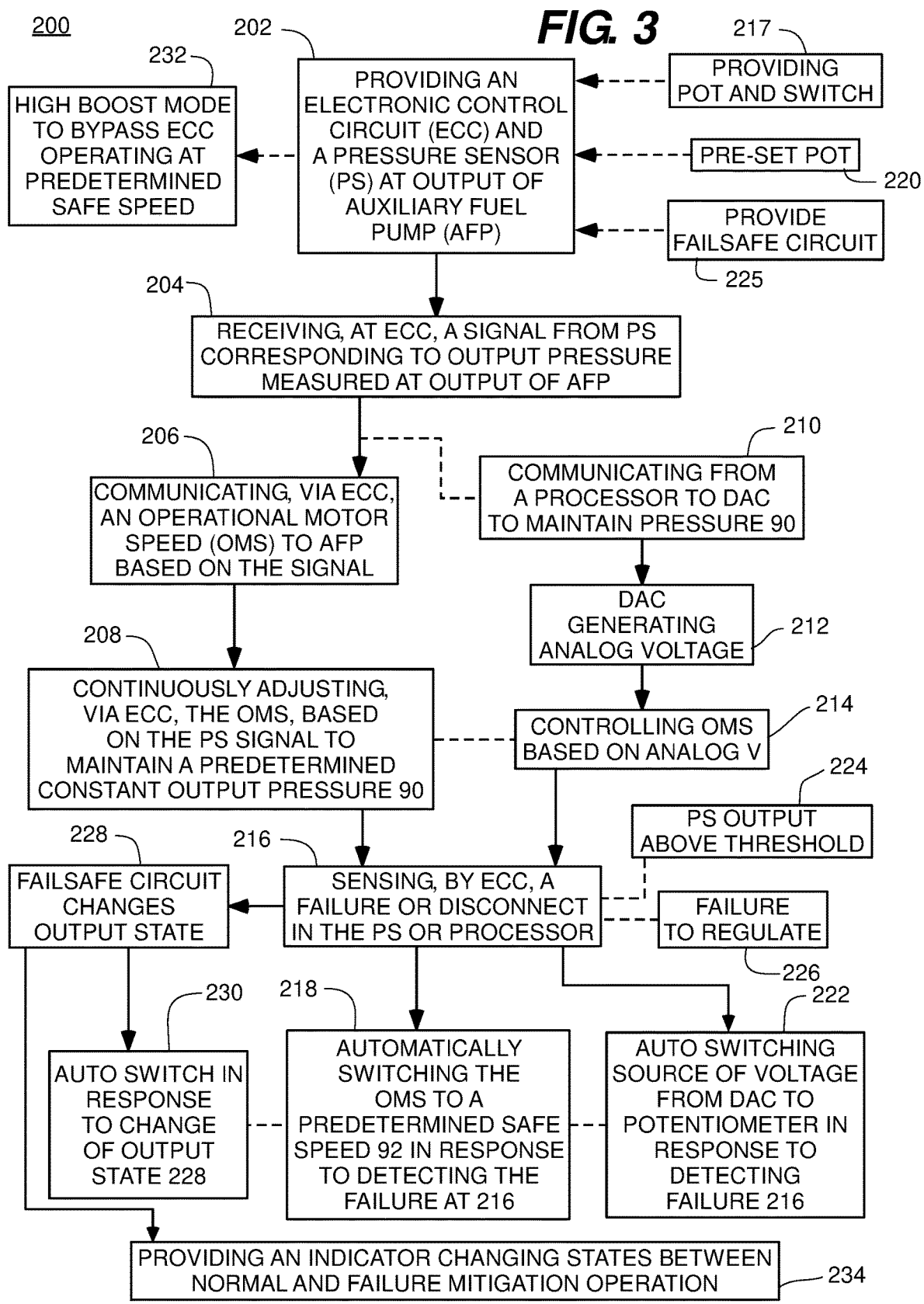

FUEL PUMP WITH ELECTRONIC CONTROLLED PRESSURE REGULATION AND FAILURE MITIGATION

CROSS-REFERENCE TO RELATED APPLICATIONS

This application claims the benefit of and priority to U.S. Provisional Application Ser. No. 63/189,576 entitled "FUEL PUMP WITH ELECTRONIC CONTROLLED PRESSURE REGULATION AND FAILURE MITIGATION FOR USE IN AIRCRAFT," filed May 17, 2021, the entirety of which is hereby incorporated herein by reference thereto.

FIELD OF THE DISCLOSURE

The present invention relates to fuel pump systems for motorized vehicles, in particular, aircraft fuel pump systems with in-line auxiliary fuel pumps.

BACKGROUND

Conventional general aviation aircraft normally have two fuel pumps, a primary pump and an auxiliary pump. The primary pumps are driven mechanically by the engine, with the fuel flow determined by engine speed. The auxiliary pumps are a safety feature driven by an electric motor, which are designed to operate in line with the primary fuel pump and to take over should the primary pump fail, particularly during critical maneuvers such as in take offs and landings. The electric motor that runs the conventional auxiliary pump is particularly designed to continually run at a fixed voltage level that is set to match the maximum requirements of the engine, that is, at the maximum levels required during critical maneuvers such as takeoff and landing, should the primary pump fail. Although this design allows the auxiliary pump to take over instantly at any time should the primary pump fail, it also unnecessarily operates the pumps continuously at the maximum levels that are only needed during critical maneuvers, i.e., at levels higher than is actually required during normal operation. A pressure relief valve is also typically provided in conventional auxiliary pump systems. When fuel from the auxiliary pump is not needed, fuel is pushed through the pressure relief valve to prevent excessive fuel pressure to the engine, possibly causing it to flood.

For safety purposes, the auxiliary pump must be operational at least during takeoff and landing. Some systems provide an option to manually switch, or reduce, the auxiliary pumps to a lower speed, or shut them off completely during non-critical operations to reduce the wear on the pumps. However, this requires the pilot to have to manually turn the pumps back on or to ramp the speed back up during an emergency situation which undesirably places another burden on the pilot to act, or avoid the mistake of not reactivating the auxiliary pump, during an emergency.

Recently, attempts have been made to address these shortcomings of known aircraft fuel pump systems. For example, systems have been developed that allow a pilot to manually set the power level of an electric auxiliary fuel pump to different power levels depending on the type of maneuvering the aircraft is, or will be, engaging in, and at what altitude the aircraft is, or will be, flying. For example, the motors of the auxiliary pump can be driven at maximum power during takeoff, and at a lower power for "normal" operation, such as cruising at various altitudes. These systems do not relieve the burden on the pilot to act to adjust the power level of the auxiliary pump during an emergency situation to avoid a serious failure. In addition, although the wear and tear on the pumps may be reduced in these systems compared to those operating at one maximum fixed level, these multi-power level systems still require the pumps to run at a level much higher than necessary so that they can take over and replace the mechanical pump if needed. Though it has been found that the performance of some aircraft engines may benefit from the added fuel pressure the auxiliary pump provides, these different types of prior art fuel pumps are disadvantageously required to operate at a level much higher than would normally be required, and to unnecessarily circulate fuel through relief valves to prevent the flooding of the engine. All of these requirements of the auxiliary fuel pump induce wear and tear, diminishing the life and reliability of the auxiliary fuel pump.

Accordingly, there is a need for a fuel pump system that reduces the workload on the auxiliary fuel pump during normal, non-emergency operation of a vehicle, such as an aircraft, and that removes any burden on the operator (pilot) to manually engage an auxiliary pump in the event of an emergency situation to mitigate engine failure.

SUMMARY

Features of the disclosure will become apparent from the following detailed description considered in conjunction with the accompanying drawings. It is to be understood, however, that the drawings are designed as an illustration only and not as a definition of the limits of this disclosure.

The present disclosure is directed to a fuel pump system, for example, for aircraft, that reduces the workload on the auxiliary fuel pump during normal, non-emergency operation of a vehicle, such as an aircraft, and that removes any burden on the operator, e.g., pilot, to manually engage an auxiliary pump in the event of an emergency situation to mitigate engine failure.

The present disclosure is also directed to an auxiliary fuel pump including an electronic control circuit that automatically maintains the needed pressure and fuel flow to the engine without operator intervention, during both normal operation and in emergency operation.

In aspects, the electronic control circuit also preferably provides automatic fault mitigation.

In further aspects, the electronic control circuit may be configured to revert automatically to preset maximum safe requirements should a problem be detected with the pressure sensor, for example, or should excessively low pressure be measured from the pressure sensor. In additional aspects, should the electronic control circuit completely fail, an operator (pilot) can still preferably engage the electric motor driving the auxiliary fuel pump with a manual switch that bypasses all pressure controls and enables the auxiliary fuel pump to operate at full power until the electronic control circuit can be safely serviced.

The present disclosure is also directed to a fuel pump system for a vehicle, for example, aviation aircraft, which includes a primary fuel pump; a fuel tank; and an auxiliary fuel pump in-line with the primary fuel pump and fluidly connected to the fuel tank. The system includes an electronic control circuit; a pressure sensor configured to measure an output pressure from the auxiliary fuel pump and to transmit a signal corresponding to the output pressure to the electronic control circuit; and an electric motor configured to drive the auxiliary fuel pump at an operational motor speed. The electric motor is electrically connected to the electronic control circuit, which is configured to continuously adjust the operational motor speed, based on the signal from the pressure sensor, to maintain a predetermined constant output pressure.

In embodiments, the electronic control circuit includes a processing device, a Digital to Analog Converter in communication with the processing device, and an operational motor speed controller electrically connected to the Digital to Analog Converter and to the electric motor. The operational motor speed controller controls the operational motor speed of the electric motor. The processing device is preferably configured to communicate a digital signal to the Digital to Analog Converter to maintain the predetermined constant output pressure based on the signal from the pressure sensor, and the Digital to Analog Converter is configured to generate an analog voltage from the digital signal. The operational motor speed controller is configured to control the operational motor speed of the electric motor based on the analog voltage generated by the Digital to Analog Converter from the digital signal.

The electronic control circuit may be further configured, in embodiments, to sense a failure or disconnect in the pressure sensor or the processing device and to automatically switch the operational motor speed to a fixed, predetermined safe speed in response to sensing the failure or disconnect.

In further embodiments, the electronic control circuit further includes a potentiometer pre-set to a fixed voltage that corresponds to a predetermined safe speed, and a switch electrically connected to the operational motor speed controller. The switch is electrically connected to the operational motor speed controller and switchably connects the operational motor speed connector to the Digital to Analog Converter and the potentiometer. The switch is configured to automatically switch the source of operating voltage to the operational motor speed controller from the Digital to Analog Converter to the potentiometer for operation of the electric motor at the predetermined safe speed in response to sensing the failure or disconnect.

In further embodiments, the switch is configured to automatically switch the source of operating voltage to the potentiometer for operation of the electric motor at the predetermined safe speed in response to an output pressure from the pressure sensor falling below a predetermined threshold, based on the signal from the pressure sensor.

In embodiments, the electronic control circuit is further configured to sense a failure to regulate the output pressure of the pressure sensor, and to automatically switch the source of operating voltage to the potentiometer for operation of the electric motor at the predetermined safe speed in response to sensing the failure to regulate.

The electrical control circuit, in embodiments, may further include a failsafe circuit in electrical communication with the processing device and operatively connected to the switch, wherein the failsafe circuit is configured to change an output state in response to the electrical control circuit sensing the failure or disconnect in the pressure sensor or in the processing device, thereby automatically switchably connecting the operational motor speed controller to the potentiometer for operation of the electric motor at the predetermined safe speed.

The system may also include a control panel switch having a plurality of modes of operation manually selectable by an operator of the vehicle, wherein one of the modes of operation selectable via the control panel switch is a high boost mode. The high boost mode is set to a fixed voltage corresponding to a predetermined safe speed. The high boost mode is electrically connected to the electric motor and bypasses the electronic control circuit.

The system, in embodiments, may further include an indicator in communication with the electronic control circuit to indicate whether the system is operating in the processor-controlled mode under normal operating conditions or in a failsafe mode with the operating motor speed fixed at the predetermined safe speed. In embodiments, the indicator is electrically connected to the failsafe circuit and is configured to change states in response to the failsafe circuit changing the output state to indicate a failure or disconnect.

The present disclosure is also directed to a method of operating a fuel pump system for a vehicle, the fuel pump system including a primary fuel pump and an auxiliary fuel pump in-line with the primary fuel pump and fluidly connected to a fuel tank, and an electric motor for driving the auxiliary fuel pump. The method preferably includes providing an electronic control circuit electrically connected to the electric motor, and a pressure sensor at an output of the auxiliary fuel pump; and receiving, at the electronic control circuit, a signal from the pressure sensor corresponding to the output pressure measured by the pressure sensor at the output of the auxiliary fuel pump. The method, in embodiments, includes communicating, from the electronic control circuit, an operational motor speed to the auxiliary fuel pump based on the signal received from the pressure sensor; and continuously adjusting, by the electronic control circuit, the operational motor speed based on the signal received from the pressure sensor to maintain a predetermined constant output pressure.

In embodiments, the electronic control circuit communicates from a processing device in the electronic control circuit, a digital signal to a Digital to Analog Converter in the electronic control circuit to maintain the predetermined constant output pressure based on the signal received, at the receiving step, from the pressure sensor. The method may further continuously adjusting the operational motor speed by generating, by the Digital to Analog Converter in the electronic control circuit, an analog voltage from the digital signal; and controlling, by an operational motor speed controller in the electronic control circuit, the operational motor speed of the electric motor based on the analog voltage generated by the Digital to Analog Converter.

The method may further include sensing, by the electronic control circuit, a failure or disconnect in the pressure sensor or a failure of the processing device, and automatically switching, via the electronic control circuit, the operational motor speed to a predetermined safe speed in response to sensing the failure or disconnect.

The method may further include, in embodiments, providing the electronic control circuit with a potentiometer and a switch electrically connected to the operational motor speed controller and switchably connected to the Digital to Analog Converter and the potentiometer. The method further includes, in embodiments, pre-setting the potentiometer to a fixed voltage corresponding to the predetermined safe speed. The automatically switching, via the electronic control circuit can then be performed by automatically switching, via the switch, a source of operating voltage from the Digital to Analog Converter to the potentiometer to operate the electric motor at the predetermined safe speed in response to the sensing the failure or disconnect.

The sensing, by the electronic control circuit, the failure or disconnect may include, for example: sensing that the signal received from the pressure sensor, at the receiving step, corresponds to an output pressure that is below a predetermined threshold, or sensing the failure of the processing device to regulate the output pressure of the pressure sensor.

Further embodiments of the method may include providing a failsafe circuit in the electronic control circuit in electrical communication with the processing device and operatively connected to the switch. The method may further include the failsafe circuit changing an output state in response to the sensing, by the electrical control circuit, the failure or disconnect in the pressure sensor or in the processing device, and switchably connecting, via the switch, the operational motor speed controller to the potentiometer from the Digital to Analog Converter for operation of the electric motor in the predetermined safe speed in response to the output state changing the output state.

The method may further include providing, via a control panel switch, manually selectable modes of operation including a high boost mode set to a fixed voltage corresponding to the predetermined safe speed. In embodiments, the method further includes operating the electric motor at the fixed voltage corresponding to the predetermined safe speed in response to selecting the high boost mode, wherein selecting the high boost mode bypasses the electronic control circuit.

In further embodiments, the method may include providing an indicator electrically connected to the failsafe circuit, and the indicator changing states in response to the failsafe circuit changing the output state in response to the electrical control circuit sensing the failure or disconnect.

The methods may be implemented to operate a fuel pump system for a vehicle, wherein the vehicle is an aviation aircraft.

In addition to the above aspects of the present disclosure, additional aspects, objects, features, and advantages will be apparent from the embodiments presented in the following description and in connection with the accompanying drawings.

BRIEF DESCRIPTION OF THE DRAWINGS

The drawings constitute a part of this disclosure and include examples, which may be implemented in various forms. It is to be understood that in some instances, various aspects of the disclosure may be shown exaggerated or enlarged to facilitate understanding. The teaching of the disclosure can be readily understood by considering the following detailed description in conjunction with the accompanying drawings.

FIG. 3 is a flow chart representation of an embodiment of a method of the present disclosure.

Figure 1:
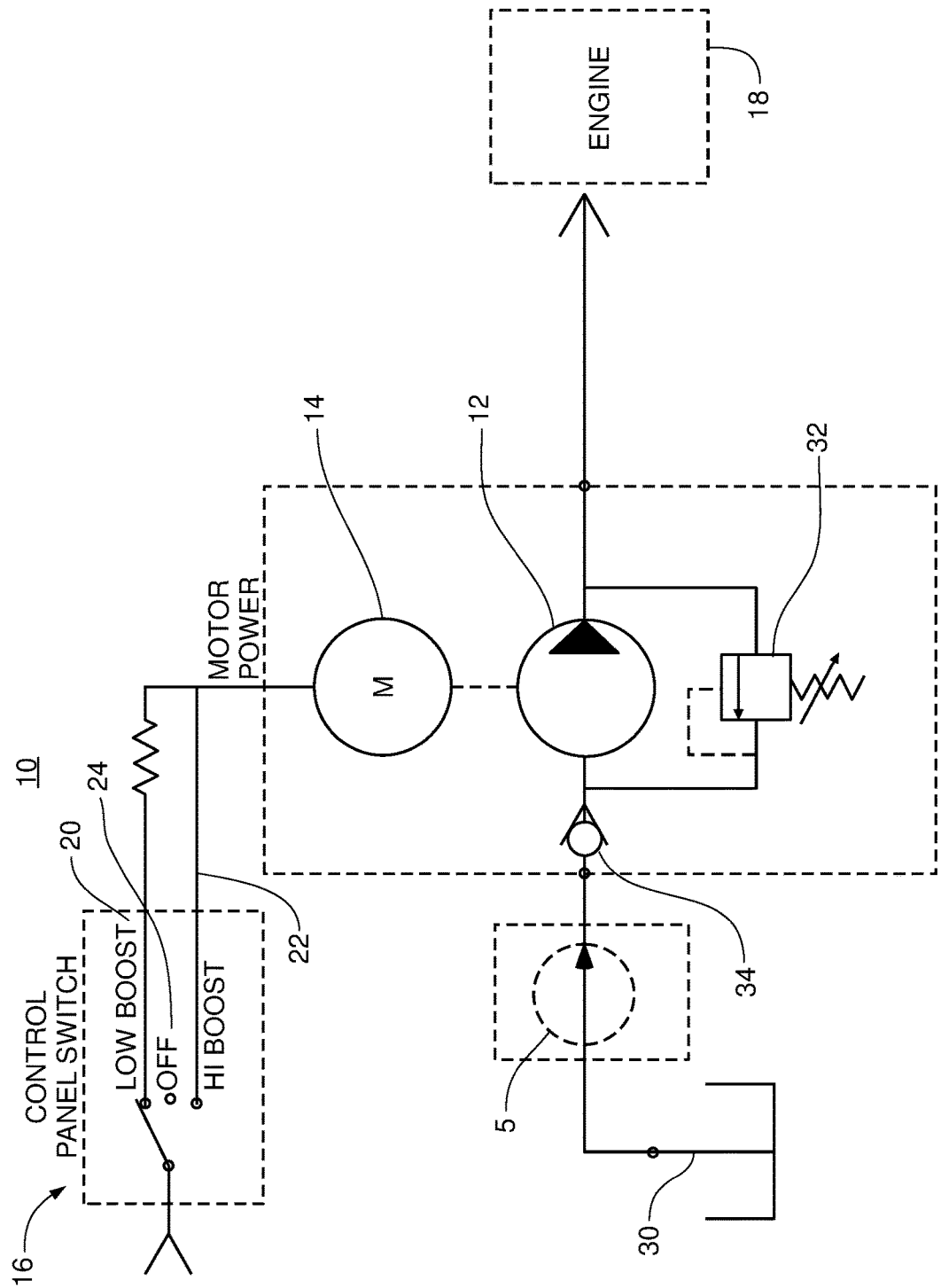
FIG. 1 is a schematic representation of a mechanically, or manually, regulated aircraft fuel pump known in the prior art.

The various aspects of the present disclosure mentioned above are described in further detail with reference to the aforementioned figures and the following detailed description of exemplary embodiments.

DETAILED DESCRIPTION

The following sections describe exemplary embodiments of the present invention. It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto.

Particular illustrative embodiments of the present disclosure are described hereinbelow with reference to the accompanying drawings; however, the disclosed embodiments are merely examples of the disclosure, which may be embodied in various forms. It should be apparent to those skilled in the art that the described embodiments provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the invention as defined herein and equivalents thereto. Well-known functions or constructions and repetitive matter are not described in detail to avoid obscuring the present disclosure in unnecessary or redundant detail. Therefore, specific structural and functional details disclosed herein are not to be interpreted as limiting. In this description, as well as in the drawings, like-referenced numbers represent elements which may perform the same, similar, or equivalent functions.

Throughout the description, where items are described as having, including, or comprising one or more specific components or features, or where methods are described as having, including, or comprising one or more specific steps, it is contemplated that, additionally, there are items of the present disclosure that consist essentially of, or consist of, the one or more recited components or features, and that there are methods according to the present disclosure that consist essentially of, or consist of, the one or more recited processing steps.

While the embodiments described in the present disclosure are directed to a particular embodiment of a fuel pump system for an aircraft, it should be understood that the system and methods may be configured for electronically-controlled fuel pump systems used in various other types of vehicles.

The present disclosure is directed to a fuel pump system including an auxiliary fuel pump that is electronically-controlled via an electronic control circuit configured to operate in various different modes, including a controlled mode for automatically regulating the operation of the electric motor and auxiliary fuel pump, and may also be configured to include operation in various fault mitigation modes.

The present disclosure also relates to methods of operation of a fuel pump system for a vehicle, for example, an aircraft, in the different modes of operation and various fault mitigation modes described herein, in accordance with parameters and executable instructions saved in computer-readable memory and executable by a processor in the electronic control circuit.

The fuel pump system of the present disclosure advantageously reduces the workload on the auxiliary fuel pump during normal, non-emergency operation of a vehicle, e.g., an aircraft, in comparison to prior art systems. The fuel pump system also removes the burden on the operator, e.g., a pilot, to manually engage an auxiliary pump in the event of an emergency situation, as is required by conventional aircraft fuel pump systems known in the art.

FIG. 1 is a schematic diagram of a mechanically regulated fuel pump system 10 known in the prior art for an aircraft, including an auxiliary fuel pump 12 configured to operate in line with a primary fuel pump 5. The auxiliary fuel pump 12 is driven by an electric motor 14, which is controlled by a manually-operated, e.g., pilot-operated, control panel switch 16. The control panel switch 16 may be configured to switch between different fixed operating voltage or power levels of the electric motor 14, configured for driving the auxiliary fuel pump 12 to deliver a pre-determined fuel flow to an engine 18. For example, the control panel switch 16, which may be operable, in embodiments, via a control panel accessible to the operator or pilot, may include a low boost mode 20, a high boost mode 22, and an off mode 24. In this case, the pilot can disengage the auxiliary fuel pump 12 altogether by switching to the off mode 24, or choose a higher pre-determined fuel flow by switching to the high boost mode 22, for example, on take-off, or choose a lower pre-determined fuel flow by switching to the low boost mode 20. The fuel is pumped through the auxiliary pump 12 from a tank 30, which may be the same tank 30 from which fuel is pumped through the primary fuel pump 5.

Still referring to FIG. 1, the mechanically regulated fuel pump system 10 also includes a pressure relief valve 32. When fuel from the auxiliary fuel pump 12 is not needed during operation, i.e., when there is no failure requiring the emergency flow of fuel provided in either of the on modes, 20, 22, for example, the auxiliary pump 12 pushes at least some of the excess fuel through the pressure relief valve 32 to prevent excessive fuel pressure to the engine 18 which could cause the engine to flood. A check valve 34 is also typically provided to prevent back-flow to the fuel tank 30.

Accordingly, the system 10 of FIG. 1 causes the auxiliary fuel pump 12 to operate at a higher level than required for non-emergency conditions and to unnecessarily circulate fuel through the relief valve 32 to prevent flooding the engine. As one of ordinary skill in the art will also appreciate, this also means that when the auxiliary pump 12 is engaged (e.g., control panel switch 16 set to one of the on modes 20, 22), the mechanically regulated fuel pump system 10 of FIG. 1 is configured to produce an output 36 of fuel flow to the engine 18 at a constant output pressure pre-determined by the mode 20, 22, set by the pilot, which will exceed what is required during normal, non-emergency flight conditions. Although the option exists to disengage the auxiliary fuel pump 12 by switching to the off mode 24, the pilot is then required to manually engage the auxiliary fuel pump 12 if an emergency situation presents itself.

Figure 2A:
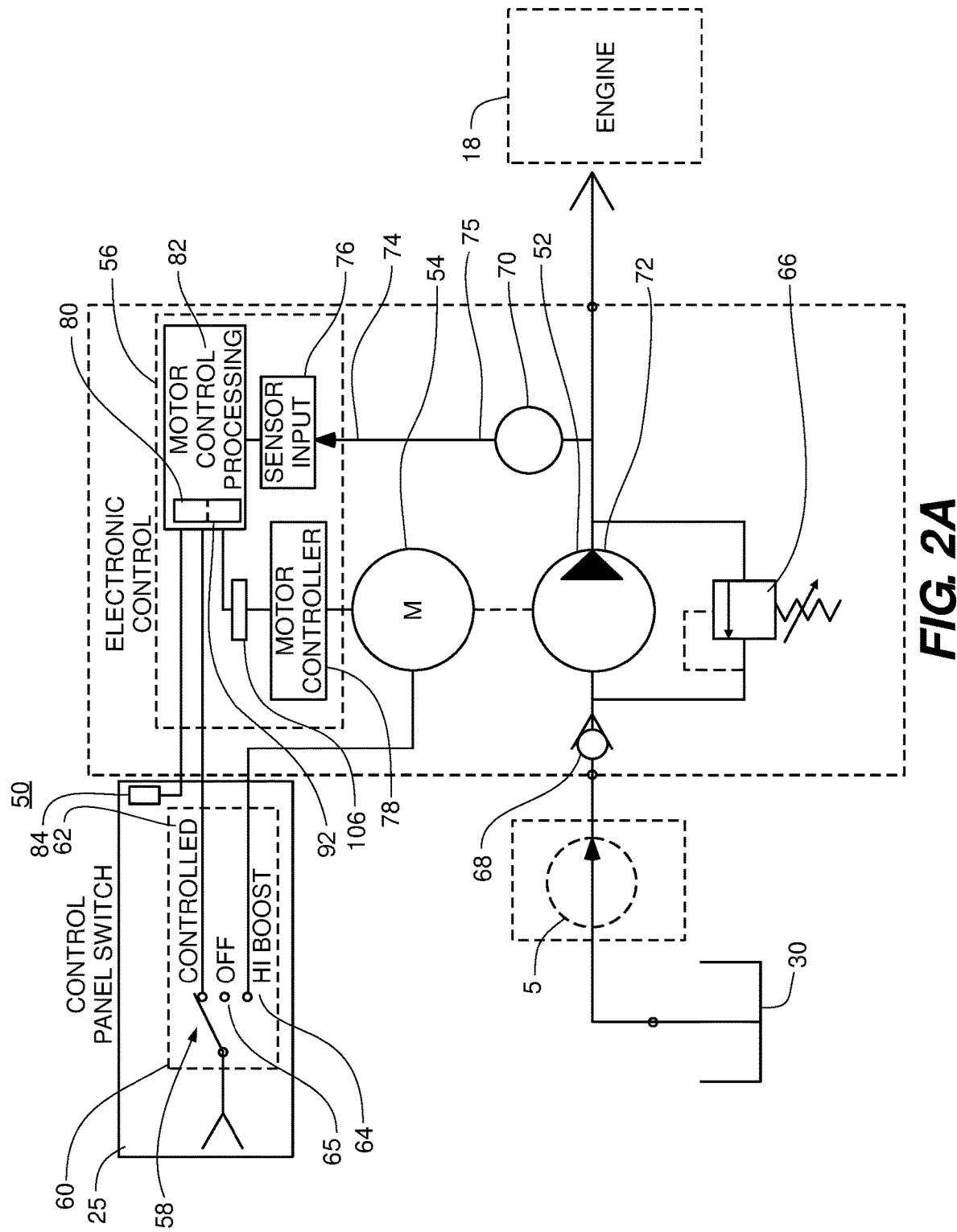
FIG. 2A is a schematic representation of an embodiment of an electronically controlled fuel pump of the present disclosure, which may be used in aircraft.

The fuel pump system of the present disclosure solves these problems of the prior art fuel pump systems for aircraft, and may also be configured for use in other vehicles. Referring to FIG. 2A, an embodiment of a fuel pump system 50 of the present disclosure, suitable for use on an aircraft, includes an auxiliary fuel pump 52 configured to operate in line with a primary fuel pump 5. Fuel may be fed from the fuel tank 30 to both the primary fuel pump 5 and to the auxiliary fuel pump 52. In embodiments, fuel tank 30 is dedicated to only feed the auxiliary fuel pump 52, a primary fuel tank (not shown) being provided to feed the primary fuel pump 5. Accordingly, the fuel tank 30 is fluidly connected to the auxiliary fuel pump 52, and in embodiments, also to the primary fuel pump 5. The system 50 also includes an electric motor 54, an electronic control circuit. 56 electrically connected to the electric motor 54, and, in embodiments, a control panel switch 60. The auxiliary fuel pump 52 is driven by the electric motor 54, which is controllable by the electronic: control circuit 56. The electronic control circuit 56, in embodiments, is switcliably connected to the control panel switch 60, which preferably includes a plurality of modes of operation 58 that may be manually selectable.

In embodiments, the control panel switch 60 may include, for example, selectable settings or positions for the following modes of operation 58: a controlled mode 62, a high boost mode 64, and an off mode 65. The control panel switch 60 is electrically and operatively connected to the electric motor 54.

The auxiliary fuel pump 52 in embodiments of the fuel pump system 50 may also include a pressure relief valve 66, in fluid connection with the auxiliary pump 52, through which the auxiliary pump 52 pushes at least some of the excess fuel therethrough to prevent excessive fuel pressure to the engine 18, when there is no failure requiring the emergency flow of fuel provided by the auxiliary fuel pump 52. The pressure relief valve 66 is provided as a safety measure to prevent flooding the engine 18. It should be noted that in the controlled mode 62 of operation, it is expected that minimal flow, if any, will result through the pressure relief valve 66. A check valve 68 may also be provided in-line with the fuel tank 30 and the auxiliary fuel pump 52 to prevent back-flow to the fuel tank 30.

The electric motor 54 is, in embodiments, configured to drive the auxiliary fuel pump 52 at an operational motor speed, which may be determined by the mode of operation selected via the control panel switch 60, as well as other conditions, such as whether a fault is detected. The electric motor 54 is electrically connected to the electronic control circuit 56. The system 50 also preferably includes an operational motor speed controller 78. In the controlled mode 62, the electric motor 54 is operatively connected to the electronic control circuit 56 via the operational motor speed controller 78, which is configured to operate in accordance with parameters and instructions received from the electronic control circuit 56, to control the operational motor speed at which to drive the auxiliary fuel pump 52.

The electronic control circuit 56 includes, in embodiments, a processing device or processor 82, also referred to herein as microprocessor 82, and a Digital to Analog Converter (DAC) 106, in communication with the processor 82. Under normal operating conditions, with no system failures, the operational motor speed controller 78 in the electronic control circuit 56 is controlled by an analog voltage derived from the Digital to Analog Converter (DAC) 106, which in turn is controlled by the processor 82 to maintain a predetermined constant output pressure, as described herein.

Referring still to FIG. 2A, the electronic control circuit 56 may be, for example, a single chip integrated circuit (IC), and preferably includes at least computer-readable memory 80 configured to store instructions and information, and the processor or processing device 82 for execution of the instructions. As one of skill in the art will appreciate, the methods described herein may be stored as instructions in computer-readable memory 80 in the electronic control circuit 56 and executed by the processor 82. Preferably, the computer-readable memory 80 is also configured to store predetermined operating parameters accessed by the processor 82 to implement the methods of the present disclosure.

To maintain constant output pressure in the controlled mode 62, still referring to FIG. 2A, the fuel pump system 50 also preferably includes an electronic pressure sensor 70 operatively connected to an output, or pressure side 72, of the auxiliary fuel pump 52 that feeds the engine 18. An electrical signal 74 corresponding to an output pressure 75 measured by the electronic pressure sensor 70 is electrically connected to an electrical sensor input 76 of the electronic control circuit 56. The electronic control circuit 56 processes the output pressure 75 transmitted from the electronic pressure sensor 70 and uses this data to control the operating parameters, e.g., the operating voltage and operational motor speed, of the electric motor 54, via the DAC 106 and operational motor speed controller 78.

In particular, the processor 82 generates a digital signal based on the electrical signal 74 received from the electronic pressure sensor 70 to compensate for any changes in the output pressure 75 in order to maintain the predetermined constant output pressure. The DAC 106 generates an analog voltage from the digital signal, which drives the operational motor speed controller 78 to control the operational motor speed.

In embodiments, when the control panel switch 60 is set to the controlled mode 62, the operational motor speed of the electric motor 54, via the operational motor speed controller 78, is continuously controlled and adjusted by the electronic control circuit 56 as a function of the output pressure 75 under normal operating conditions. In particular, the operational motor speed is reduced when pressure demands are not high, i.e., when the output pressure 75 is not high, and increased when pressure demands dictate, e.g., when the output pressure 75 exceeds a predetermined threshold. In this way, the output pressure 75 of the auxiliary fuel pump 52 may be kept at an optimal constant level over a wide range of operating conditions, from zero fuel flow to the maximum required, for instance, during take-off.

As an example of operation in the controlled mode 62, under normal operating conditions, if the primary fuel pump 5 fails, an immediate drop in the output pressure 75 of the auxiliary fuel pump 52 is immediately communicated via the pressure sensor 70 to the processor 82 in the electronic control circuit 56. The processor 82 is configured to communicate a digital signal to the DAC 106 that compensates for the drop, or change in the output pressure 75, by increasing the power to the electric motor 54 driving the auxiliary fuel pump 52, via the DAC 106 and operational motor speed controller 78. The digital signal that is sent to the DAC 106 thus maintains the predetermined constant output pressure based on the signal received from the pressure sensor 70. In this way, the output pressure 75 of the auxiliary fuel pump 52 is maintained at the constant output pressure independent of fuel flow. The constant operating pressure is a predetermined constant output pressure that is set based on the particular normal operating conditions for the auxiliary fuel pump 52, and may be stored in memory 80 for access by the processor 82 in implementing the control process.

As should be apparent from FIG. 2A and the foregoing description, the electronic control circuit 56 is operatively connected to the control panel switch 60, the pressure sensor 70, and the electric motor 54, and is configured to receive and/or transmit data and/or electrical signals from/to each, and to process such data and/or electronic signals to implement the methods described herein.

In embodiments, the preferred mode of operation of the fuel pump system 50 is the controlled mode 62. The off mode 65 may be provided as an option that allows an operator e.g., a pilot) to disengage the auxiliary fuel pump 52 altogether. The high boost mode 64 is preferably provided, in embodiments, as an additional, manually selected, fault mitigation option in the event, for example, the operational motor speed controller 78 or other circuitry in the electronic control circuit 56 required to control and provide power to the motor 54 in the controlled mode 62, fails. In the event of such an electronic failure, the pilot can manually switch to the high boost mode 64, via 64 the control panel switch 60, to bypass the electronic control circuit 56 altogether. The operating voltage and/or power levels of the electric motor 54 are set in the high boost mode 64 to the fixed, predetermined safe speed levels required to operate the electric motor 54 at maximum speed, i.e., under all circumstances. This allows the pilot to revert to the maximum fuel flow through the auxiliary fuel pump 52, allowing safe back-up operation in the event of failure during, for example, takeoff or critical maneuvers, until the system can be serviced.

Figure 2B:
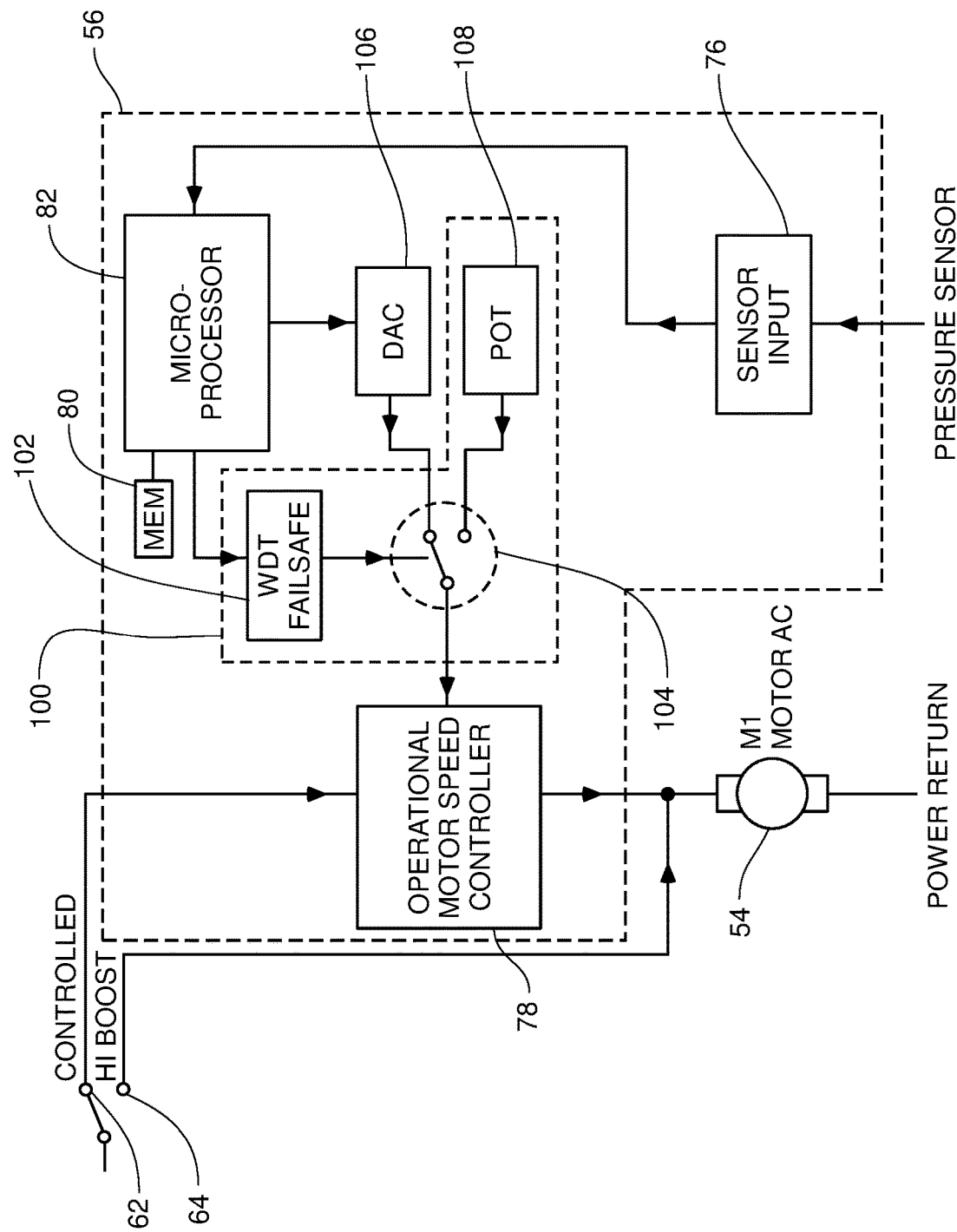
FIG. 2B is a schematic representation of an embodiment of a failsafe system portion of the electronically controlled fuel pump of the present disclosure.

Referring to FIGS. 2A and 2B, in additional embodiments of the fuel pump system 50, the electronic control circuit 56 may include a failsafe system 100 configured with additional control processes for fault-mitigation to further mitigate the consequences of a system failure or malfunction. In embodiments, the control or fault-mitigation steps may be stored as instructions, for example, in the computer-readable memory 80 in the electronic control circuit 56 and executed by the processor 82. In embodiments of the system 50, referring to FIG. 2B, for example, the electronic control circuit 56 is configured to automatically switch control of the operational motor speed of the auxiliary fuel pump 52 from the microprocessor 82 to a fixed source 108, exemplified by potentiometer 108 in FIG. 2B, configured to provide a fixed, predetermined operating voltage or power corresponding to the fixed, predetermined safe speed 92, based on a failure or a change detected in the system 50. The electronic control circuit 56 may be configured to execute and operate in accordance with at least one or more of the methods of the present disclosure for failure mitigation, also referred to herein as failure-mitigation modes, each of which may operate independently of each other to insure adequate fuel flow to the motor. Additional fault-mitigation is provided by allowing manually switching, by an operator, from the controlled mode of operation 62 to the high boost mode of operation 64 as described above.

In accordance with one failure-mitigation method, the electronic control circuit 56 may be configured to sense that the electronic pressure sensor 70 has been disconnected, for example, by detecting a drop in a measured current through the pressure sensor to substantially zero (or at noise level of detector), indicating that controlled regulation of the electric motor 54 as a function of the measured output pressure 75 is no longer possible. In response to receiving a signal corresponding to a disconnect, or no current, from the electronic pressure sensor 70, the microprocessor 82 may communicate a failure to the failsafe system 100, which in turn responds by switching from the microprocessor-directed operational motor speed to the fixed, predetermined safe speed 92 (referenced in FIG. 3). The predetermined safe speed 92 setting in embodiments is preferably adjustable prior to operation, so that it can be fixed prior to implementation of the electronic control circuit 56, and would be pre-set in accordance with the fuel needs of a particular fuel pump part number required per vehicle, for example, aircraft.

In accordance with another failure mitigation mode, the predetermined safe speed 92 setting may also be automatically triggered in response to a signal indicating failure of the controlled mode 62 of operation of the electronic control circuit 56, i.e., when the regulation control portion of the electronic control circuit 56 has lost its ability to successfully control the output pressure 75, or in the event of a faulty processor 82. This would be the result, for example, of a faulty pressure sensor, which, in embodiments, is indicated by the measured output pressure 75 dropping below a predetermined threshold.

In accordance with another failure mitigation process or mode, as described supra in reference to the high boost mode 64 controllable via the control panel switch 60, in the event the electronic control circuit 56 fails completely, the operator (pilot) has the option to bypass the entire electronic control circuit 56 and run the auxiliary pump motor 54 at full speed, i.e., at the predetermined safe speed 92, by manually switching to the high boost mode 64. In the high boost mode 64, the predetermined safe speed 92 corresponds to fixed, predetermined operating voltage and/or power levels required to operate the electric motor 54 at maximum speed, insuring adequate fuel flow and pressure, under all conditions. This is the default mode of operation for many prior art auxiliary fuel pumps and, as previously described, puts stress on the pressure relief valve 66 and engine 18.

For any of the fault mitigation processes, an indicator 84, for example, a sound and/or visual (LED) indicator may be provided on a control panel 25, which preferably also includes the control panel switch 60. The indicator 84 operatively communicates with the electronic control circuit 56, e.g., via the processor 82, to alert the operator of an operational status, for example, that the operational status of the system had switched to the indicated failure mitigation mode of operation. The indicator 84 includes at least two states of operation (OFF and ON for example), indicating at least two different operational status of the system, for example, normal operation and at least one of the failure mitigation modes of operation. The indicator 84 is configured to change state of operation to another based on the operational status communicated from the electronic control circuit 56. For example, an LED may be OFF in normal operation and may turn ON, or change color, in response to one of the failure mitigation modes being executed and the system switching from normal operation to failsafe operation, wherein the operational motor speed is fixed at the predetermined safe speed 92, in accordance with one of the failure mitigation modes. In embodiments, different status indicators, for example different colors, may be used to indicate each of the possible failure mitigation modes of operation. As described herein, different failure conditions or events may automatically switch the operational motor speed of the auxiliary fuel pump to the predetermined safe speed 92, in response to detecting a problem or failure in the system.

Referring to FIG. 2B, the failsafe system 100, in embodiments, includes a failsafe circuit 102 that is separate from the microprocessor 82, a potentiometer 108 and a switch 104. The failsafe circuit 102 allows the source of the analog voltage to the operational motor speed controller 78 to automatically switch, via switch 104, from the Digital to Analog Converter (DAC) 106 to the potentiometer 108 for fixed speed control (failsafe operation) in response to a fault being detected in the system that could prevent continued safe operation through the sensor feedback regulated DAC 106.

The potentiometer 108 is pre-set manually to the predetermined safe speed 92 (as referenced in FIG. 3). The predetermined safe speed 92 is determined, based on the needs of a particular system, to cause the auxiliary fuel pump 52 to run at a speed sufficient to supply the maximum flow and pressure needs, under all circumstances, including during critical maneuvers, take-offs and landings, in the event that the primary pump fails.

In embodiments, the failsafe circuit 102 responsible for determining the analog voltage source (potentiometer 108 or microprocessor 82 controlled DAC 106), is operatively connected to the switch 104, which may be a single pole, two position switch. In embodiments, the failsafe circuit 102 includes a Watchdog Timer (WDT). This switch 104 is, in embodiments, a solid state device used to select one of two analog inputs, controlled by a logic signal produced by the WDT. The selected input then feeds the switch's output pin, which is connected to the operational motor speed controller 78. In this way, the failsafe circuit 102, via the WDT in embodiments, automatically determines the source of the analog voltage to the operational motor speed controller 78, and whether the operational motor speed will be fixed (via potentiometer 108) or continuously adjusted to maintain constant output pressure (via microprocessor 82 and DAC 106).

The WDT, as well understood to those of skill in the art, consists of a timer that needs to be sent reset pulses at a time interval less than its timeout period. If a pulse is not sent in time, the WDT output will change state as long as the reset pulse is absent. This output state change is usually used to reset a microprocessor, but in the system 50 of the present disclosure, it toggles the state of the switch 104 controlling the analog voltage source from the DAC 106 to the potentiometer 108.

In embodiments of the system 50 including the indicator 84, the indicator 84 may be electrically connected to the failsafe circuit 102, for example, to the output pin of the WDT. In this way, the indicator 84 changes state in response to the failsafe circuit changing the output state to indicate the system 50 is operating in a failsafe mode with the operating motor speed being fixed to the predetermined safe speed set by the potentiometer 108.

Examples of Failsafe Operation Via the Failsafe Circuit

Example 1—Loss of pressure sensing feedback, for example, due to bad pressure sensor or broken connection. The electronic control circuit 56 continuously monitors the electrical signal 74 from the sensor 70, the current used by the sensor 70, which is consistent and known under all nominal operational conditions. When this current either exceeds a predetermined threshold, or falls below a different preset level, the microprocessor 82 recognizes the pressure data to be invalid. In a similar manner, if the pressure data appears too low or too high for a given motor speed command, the pressure sensor data is deemed invalid. In these cases, the microprocessor 82 intentionally ignores the data received from the pressure sensor 70 and enables fixed speed operation by switching the source of the analog voltage to the potentiometer 108. In embodiments, this switch occurs in response to a WDT in the failsafe circuit 102 ceasing to receive a reset pulse, as described above.

Example 2—Loss of microprocessor control, due to firmware being corrupted or a microprocessor failure. In setting up the logic for the microprocessor 82, care is taken to 'service' the WDT with a reset pulse within the timeout period of the WDT. This causes motor speed control to reside with the microprocessor controlled DAC 106. Upon firmware or microprocessor failure, the pulse is not sent, and control switches over to the fixed setting. Care is taken to locate the WDT reset pulse command in one spot only of the code flow, in a spot least likely to be involved in a loop caused by firmware corruption or errors.

Example 3—Loss of power output (any electric motor driver circuitry may fail due to overvoltage conditions, reverse power transients, overheating, over current conditions, and so on). If this part of the circuitry is damaged or fails, the only solution is to manually bypass the entire electronic control circuit 56, circumventing the power circuitry entirely and powering the motor directly off of the main voltage bus. The operator can manually bypass the electronic control circuit 56 by switching to the high boost mode 64 of operation via the control panel switch 58 as described herein.

Embodiments of methods 200 of the present disclosure of operating a fuel pump system for a vehicle that includes a primary fuel pump and an auxiliary fuel pump in-line with the primary fuel pump, and an electric motor for driving the auxiliary fuel pump, are further described herein with reference to FIG. 3, as well as to FIGS. 2A and 2B. In reference to FIG. 2A, certain steps in the methods and modes of operation described herein may be stored as instructions in computer-readable memory 80 in the electronic control circuit 56 and executed by the processor 82, wherein the electronic control circuit 56, in embodiments, the computer-readable memory 80, is also configured to store the predetermined operating parameters that can be accessed by the processor 82 to implement the methods of the present disclosure. Referring to FIG. 3, predetermined operating parameters may be stored in the electronic control circuit 56, in embodiments, in the computer-readable memory 80, and imported into the instructions executed by the processor 82 to perform method steps in reference to FIG. 3. The predetermined operating parameters may include one or more of the predetermined constant output pressure 90 and the predetermined threshold of output pressure 96 as measured by the pressure sensor 70 and the predetermined safe speed 92.

In embodiments, the method 200 includes providing, at 202, an electronic control circuit 56 electrically connected to the electric motor 54, and a pressure sensor 70 at an output of the auxiliary fuel pump 52.

In embodiments, the method may include receiving, at 204, at the electronic control circuit 56, a signal 74 from the pressure sensor 70 corresponding to the output pressure 75 from the auxiliary fuel pump 52.

In embodiments, the method further includes communicating, at 206, via the electronic control circuit 56, an operational motor speed to the auxiliary fuel pump 52 based on the signal received from the pressure sensor 70.

The method further includes continuously adjusting, at 208, via the electronic control circuit 56, the operational motor speed based on the signal 74 from the pressure sensor 70 to maintain a predetermined constant output pressure.

The communicating, at 206, may further include communicating, at 210, from a processing device 82 in the electronic control circuit 56, a digital signal to a Digital to Analog Converter 106 in the electronic control circuit to maintain the predetermined constant output pressure based on the signal 74 received, at the receiving step, 204 from the pressure sensor 70.

The continuously adjusting, at 208, by the electronic control circuit 56, in embodiments, may further include generating, at 212, by the Digital to Analog Converter 106 in the electronic control circuit 56, an analog voltage from the digital signal, and controlling, at 214, by an operational motor speed controller 78 in the electronic control circuit 56, the operational motor speed of the electric motor 54 based on the analog voltage generated by the Digital to Analog Converter 56.

In embodiments, the method may further include sensing, at 216, by the electronic control circuit, a failure or disconnect in the pressure sensor or a failure of the processing device, and automatically switching, at 218, via the electronic control circuit, the operational motor speed to a predetermined safe speed in response to sensing the failure or disconnect.

In further embodiments, the method includes providing, at 217, the electronic control circuit 56 with a potentiometer 108 and a switch 104 electrically connected to the operational motor speed controller 78 and switchably connected to the Digital to Analog Converter (DAC) 106 and the potentiometer 108. The method further includes pre-setting the potentiometer, at 220, to a fixed voltage corresponding to the predetermined safe speed.

The automatically switching, at 218, then includes automatically switching, at 222, via the switch 104, a source of operating voltage from the Digital to Analog Converter 106 to the potentiometer 108 to operate the electric motor at the predetermined safe speed in response to the sensing, at 216, the failure or disconnect.

In further embodiments, the electronic control circuit 56 may sense, at 224, the failure or defect from the signal received from the pressure sensor, at the receiving step, corresponding to an output pressure that is below a predetermined threshold.

In still further embodiments, the electronic control circuit 56 may sense, at 226, from the signal received from the pressure sensor, at the receiving step, at 204, a failure of the processing device to regulate the output pressure of the pressure sensor 70.

Embodiments of the method 200 also include providing a failsafe circuit, at 225, in the electronic control circuit 56 in electrical communication with the processing device 82 and operatively connected to the switch 104. The method may further include the failsafe circuit changing an output state, at 228, in response to the sensing, by the electronic circuit, at 216, the failure or disconnect in the pressure sensor or in the processing device. The method then further includes automatically switching, at 230, via the switch 104, the source of the operating voltage to the potentiometer from the Digital to Analog Converter for operation of the electric motor in the predetermined safe speed in response to the failsafe circuit changing the output state, at 228.

Referring still to FIG. 3, the method 200 may further include providing, via a control panel switch 60, manually selectable modes of operation including a high boost mode 64 set to a fixed voltage corresponding to the predetermined safe speed, the method further including operating, at 232, the electric motor at the predetermined safe speed in response to selecting the high boost mode, wherein selecting the high boost mode bypasses the electronic control circuit.

Embodiments of the method 200 also include providing an indicator 84, at 234, in communication with the electronic control circuit 56, the method including the indicator 84 changing states in response to detecting, via the electronic control circuit 56, a switch between a normal mode of operation and a failure mitigation mode of operation of the fuel pump system 50. In embodiments, the indicator 84 is electrically connected to the failsafe circuit 100, the method including the indicator 84 changing states, at 234, in response to the failsafe circuit changing the output state, at 228, in response to the sensing, at 216, by electrical control circuit, the failure or disconnect.

One of ordinary skill in the art will appreciate the numerous advantages of the fuel pump system of the present disclosure, particularly for use in aircraft. For example, the workload on the auxiliary pump of the system is advantageously controlled so that the auxiliary pump only works as hard as necessary, under any operation of the aircraft or other vehicle, to maintain good fuel flow and to allow the primary pump to operate as needed. Because the auxiliary pump is operated as a back-up, and not operated continuously at maximum load, the workload on the auxiliary pump is very low except during failure of the main pump.

The fuel pump of the present disclosure also automatically maintains the needed pressure and fuel flow to the engine, eliminating the requirement of pilot intervention to engage the auxiliary fuel pump.

More advantages of the fuel pump system of the invention may be summarized as follows. First, embodiments of the auxiliary fuel pumps of the system are more reliable due to less wear than otherwise occurs in prior art auxiliary fuel pumps that are run at unnecessarily high power levels. In addition, the fuel pressure output to the engine is advantageously maintained at a constant level over a wider fuel flow range in the fuel pump system of the present disclosure. There is also reduced wear and reliance on the pressure relief valve of the auxiliary pump due to the lack of, or at least minimal, flow through the pressure relief valve. Further, minimal operator (e.g., pilot) intervention is required and operation is simplified. Finally, the failure mitigation features ensure that the auxiliary pump remains operational even if the electronic control system fails.

While the invention has been particularly shown and described with reference to specific embodiments, it should be apparent to those skilled in the art that the foregoing is illustrative only and not limiting, having been presented by way of example only. Various changes in form and detail may be made therein without departing from the spirit and scope of the invention. Therefore, numerous other embodiments are contemplated as falling within the scope of the present invention as defined by the accompanying claims and equivalents thereto.

What is claimed is:

1. A fuel pump system for a vehicle, comprising:
a primary fuel pump;
a fuel tank;
an auxiliary fuel pump in-line with the primary fuel pump and fluidly connected to the fuel tank;
an electronic control circuit, the electronic control circuit including a processing device;
a pressure sensor configured to measure an output pressure from the auxiliary fuel pump and to transmit a signal corresponding to the output pressure to the electronic control circuit;
an electric motor configured to drive the auxiliary fuel pump at an operational motor speed, wherein the electric motor is electrically connected to the electronic control circuit; and
wherein the electronic control circuit is configured to continuously adjust the operational motor speed via the processing device, based on the signal from the pressure sensor to maintain a predetermined constant output pressure, and
wherein the electronic control circuit is further configured to sense a failure or disconnect in the pressure sensor or the processing device and to automatically switch control of the operational motor speed from the processing device to a fixed source that is configured to provide a fixed, predetermined operating voltage or power corresponding to a predetermined, safe speed in response to sensing the failure or disconnect, wherein the fixed source is a potentiometer pre-set to a fixed voltage corresponding to the predetermined safe speed.

2. A fuel pump system for a vehicle, comprising:
a primary fuel pump;
a fuel tank;
an auxiliary fuel pump in-line with the primary fuel pump and fluidly connected to the fuel tank;
an electronic control circuit, the electronic control circuit including a processing device;
a pressure sensor configured to measure an output pressure from the auxiliary fuel pump and to transmit a signal corresponding to the output pressure to the electronic control circuit;
an electric motor configured to drive the auxiliary fuel pump at an operational motor speed, wherein the electric motor is electrically connected to the electronic control circuit; and
wherein the electronic control circuit is configured to continuously adjust the operational motor speed via the processing device, based on the signal from the pressure sensor to maintain a predetermined constant output pressure, and
wherein the electronic control circuit is further configured to sense a failure or disconnect in the pressure sensor or the processing device and to automatically switch control of the operational motor speed from the processing device to a fixed source that is configured to provide a fixed, predetermined operating voltage or power corresponding to a predetermined, safe speed in response to sensing the failure or disconnect, and
wherein the electronic control circuit includes a Digital to Analog Converter in communication with the processing device under normal operating conditions, and an operational motor speed controller electrically connected to the Digital to Analog Converter and to the electric motor, the operational motor speed controller controlling the operational motor speed of the electric motor, wherein the processing device is configured to communicate a digital signal to the Digital to Analog Converter to maintain the predetermined constant output pressure based on the signal from the pressure sensor under normal operating conditions, the Digital to Analog Converter is configured to generate an analog voltage from the digital signal, and the operational motor speed controller is configured to control the operational motor speed of the electric motor based on the analog voltage generated by the Digital to Analog Converter from the digital signal, and
wherein the electronic control circuit further includes a switch electrically connected to the operational motor speed controller and switchably connected to the Digital to Analog Converter and the fixed source, wherein the switch is configured to automatically switch a source of operating voltage to the operational motor speed controller from the Digital to Analog Converter to the fixed source for operation of the electric motor at the predetermined safe speed in response to sensing the failure or disconnect.

3. The fuel pump system of claim 2, wherein the electronic control circuit is further configured to automatically switch the source of operating voltage to the fixed source for operation of the electric motor at the predetermined safe speed in response to the output pressure from the pressure sensor falling below a predetermined threshold, based on the signal from the pressure sensor.

4. The fuel pump system of claim 2, wherein the electronic control circuit is further configured to sense a failure to regulate the output pressure of the pressure sensor, and to automatically switch the source of operating voltage to the fixed source for operation of the electric motor at the predetermined safe speed in response to sensing the failure to regulate.

5. The fuel pump system of claim 2, the electrical control circuit further including a failsafe circuit in electrical communication with the processing device and operatively connected to the switch, wherein the failsafe circuit is configured to change an output state in response to the electrical control circuit sensing the failure or disconnect in the pressure sensor or in the processing device, thereby automatically switchably connecting the operational motor speed controller to the fixed source for operation of the electric motor at the predetermined safe speed.

6. The fuel pump system of claim 5, further including an indicator in communication with the electronic control circuit, wherein the indicator is electrically connected to the failsafe circuit and is configured to change states in response to the failsafe circuit changing the output state to indicate a failure or disconnect.

7. A fuel pump system for a vehicle, comprising:
a primary fuel pump;
a fuel tank;
an auxiliary fuel pump in-line with the primary fuel pump and fluidly connected to the fuel tank;
an electronic control circuit;
a pressure sensor configured to measure an output pressure from the auxiliary fuel pump and to transmit a signal corresponding to the output pressure to the electronic control circuit;
an electric motor configured to drive the auxiliary fuel pump at an operational motor speed, wherein the electric motor is electrically connected to the electronic control circuit; and
wherein the electronic control circuit is configured to continuously adjust the operational motor speed based on the signal from the pressure sensor to maintain a predetermined constant output pressure; and
a control panel switch having a plurality of modes of operation manually selectable by an operator of the vehicle, wherein one of the modes of operation selectable via the control panel switch is a high boost mode, wherein the high boost mode is set to a fixed voltage corresponding to a predetermined safe speed, and wherein the control panel switch in the high boost mode is electrically connected to the electric motor and bypasses the electronic control circuit.

8. The fuel pump system of claim 7, wherein the vehicle is an aviation aircraft.

9. The fuel pump system of claim 7, wherein the electronic control circuit incudes a processing device, the electronic control circuit being configured to continuously adjust the operational motor speed via the processing device, and wherein the electronic control circuit is further configured to sense a failure or disconnect in the pressure sensor or the processing device and to automatically switch control of the operational motor speed from the processing device to a fixed source that is configured to provide a fixed, predetermined operating voltage or power corresponding to a predetermined, safe speed in response to sensing the failure or disconnect.

10. The fuel pump system of claim 9, wherein the electronic control circuit includes a Digital to Analog Converter in communication with the processing device under normal operating conditions, and an operational motor speed controller electrically connected to the Digital to Analog Converter and to the electric motor, the operational motor speed controller controlling the operational motor speed of the electric motor, wherein the processing device is configured to communicate a digital signal to the Digital to Analog Converter to maintain the predetermined constant output pressure based on the signal from the pressure sensor under normal operating conditions, the Digital to Analog Converter is configured to generate an analog voltage from the digital signal, and the operational motor speed controller is configured to control the operational motor speed of the electric motor based on the analog voltage generated by the Digital to Analog Converter from the digital signal.

11. The fuel pump system of claim 10, wherein the electronic control circuit further includes a switch electrically connected to the operational motor speed controller and switchably connected to the Digital to Analog Converter and the fixed source, wherein the switch is configured to automatically switch a source of operating voltage to the operational motor speed controller from the Digital to Analog Converter to the fixed source for operation of the electric motor at the predetermined safe speed in response to sensing the failure or disconnect.

12. The fuel pump system of claim 11, wherein the electronic control circuit is further configured to automatically switch the source of operating voltage to the fixed source for operation of the electric motor at the predetermined safe speed in response to the output pressure from the pressure sensor falling below a predetermined threshold, based on the signal from the pressure sensor.

13. The fuel pump system of claim 11, wherein the electronic control circuit is further configured to sense a failure to regulate the output pressure of the pressure sensor, and to automatically switch the source of operating voltage to the fixed source for operation of the electric motor at the predetermined safe speed in response to sensing the failure to regulate.

14. The fuel pump system of claim 11, the electrical control circuit further including a failsafe circuit in electrical communication with the processing device and operatively connected to the switch, wherein the failsafe circuit is configured to change an output state in response to the electrical control circuit sensing the failure or disconnect in the pressure sensor or in the processing device, thereby automatically switchably connecting the operational motor speed controller to the fixed source for operation of the electric motor at the predetermined safe speed.

15. A method of operating a fuel pump system for a vehicle, the fuel pump system including a primary fuel pump and an auxiliary fuel pump in-line with the primary fuel pump and fluidly connected to a fuel tank, and an electric motor for driving the auxiliary fuel pump, the method comprising:
providing an electronic control circuit electrically connected to the electric motor, and a pressure sensor at an output of the auxiliary fuel pump;
receiving, at the electronic control circuit, a signal from the pressure sensor corresponding to the output pressure measured by the pressure sensor at the output of the auxiliary fuel pump;
communicating, via a processing device associated with the electronic control circuit, an operational motor speed to the auxiliary fuel pump based on the signal received from the pressure sensor;
continuously adjusting, via the processing device, the operational motor speed based on the signal received from the pressure sensor under normal operating conditions to maintain a predetermined constant output pressure; and sensing, by the electronic control circuit, a failure or disconnect in the pressure sensor or the processing device, and automatically switching control, via the electronic control circuit, of the operational motor speed from the processing device to a fixed source that is configured to provide a fixed, predetermined operating voltage or power corresponding to a predetermined safe speed in response to sensing the failure or disconnect, wherein the fixed source is a potentiometer pre-set to a fixed voltage corresponding to the predetermined safe speed.

16. A method of operating a fuel pump system for a vehicle, the fuel pump system including a primary fuel pump and an auxiliary fuel pump in-line with the primary fuel pump and fluidly connected to a fuel tank, and an electric motor for driving the auxiliary fuel pump, the method comprising:

providing an electronic control circuit electrically connected to the electric motor, and a pressure sensor at an output of the auxiliary fuel pump;

receiving, at the electronic control circuit, a signal from the pressure sensor corresponding to the output pressure measured by the pressure sensor at the output of the auxiliary fuel pump;

communicating, via a processing device associated with the electronic control circuit, an operational motor speed to the auxiliary fuel pump based on the signal received from the pressure sensor;

continuously adjusting, via the processing device, the operational motor speed based on the signal received from the pressure sensor under normal operating conditions to maintain a predetermined constant output pressure; and sensing, by the electronic control circuit, a failure or disconnect in the pressure sensor or the processing device, and automatically switching control, via the electronic control circuit, of the operational motor speed from the processing device to a fixed source that is configured to provide a fixed, predetermined operating voltage or power corresponding to a predetermined safe speed in response to sensing the failure or disconnect, wherein the communicating, via the electronic control circuit, includes communicating a digital signal to a Digital to Analog Converter in the electronic control circuit to maintain the predetermined constant output pressure based on the signal received, at the receiving step, from the pressure sensor; and the continuously adjusting, by the electronic control circuit, under normal operating conditions includes generating, by the Digital to Analog Converter in the electronic control circuit, an analog voltage from the digital signal, and controlling, by an operational motor speed controller in the electronic control circuit, the operational motor speed of the electric motor based on the analog voltage generated by the Digital to Analog Converter, the method further including providing the electronic control circuit with a switch electrically connected to the operational motor speed controller and switchably connected to the Digital to Analog Converter and the fixed source, and pre-setting the fixed source to the fixed, predetermined operating voltage or power corresponding to the predetermined safe speed, and wherein the automatically switching, via the electronic control circuit, includes automatically switching, via the switch, a source of operating voltage from the Digital to Analog Converter to the fixed source to operate the electric motor at the predetermined safe speed in response to the sensing the failure or disconnect.

17. The method of claim 16, wherein the communicating, via the electronic control circuit, includes communicating a digital signal to a Digital to Analog Converter in the electronic control circuit to maintain the predetermined constant output pressure based on the signal received, at the receiving step, from the pressure sensor; and the continuously adjusting, by the electronic control circuit, under normal operating conditions includes generating, by the Digital to Analog Converter in the electronic control circuit, an analog voltage from the digital signal, and controlling, by the operational motor speed controller in the electronic control circuit, the operational motor speed of the electric motor based on the analog voltage generated by the Digital to Analog Converter.

18. The method of claim 16, wherein the sensing, by the electronic control circuit, the failure or disconnect includes sensing that the signal received from the pressure sensor, at the receiving step, corresponds to the output pressure being below a predetermined threshold.

19. The method of claim 16, wherein the sensing, by the electronic control circuit, the failure or disconnect includes sensing a failure of the processing device to regulate the output pressure of the pressure sensor.

20. The method of claim 16, further including providing a failsafe circuit in the electronic control circuit in electrical communication with the processing device and operatively connected to the switch, the method further including the failsafe circuit changing an output state in response to the sensing, by the electronic control circuit, the failure or disconnect in the pressure sensor or in the processing device, and automatically switching, via the switch, the source of operating voltage to the fixed source from the Digital to Analog Converter to operate the electric motor at the predetermined safe speed in response to the failsafe circuit changing the output state.

21. The method of claim 20, further including providing an indicator electrically connected to the failsafe circuit, the method including the indicator changing states in response to the failsafe circuit changing the output state in response to the sensing, by the electrical control circuit, the failure or disconnect.

22. The method of claim 21, wherein the vehicle is an aviation aircraft.

23. A method of operating a fuel pump system for a vehicle, the fuel pump system including a primary fuel pump and an auxiliary fuel pump in-line with the primary fuel pump and fluidly connected to a fuel tank, and an electric motor for driving the auxiliary fuel pump, the method comprising:

providing an electronic control circuit electrically connected to the electric motor, and a pressure sensor at an output of the auxiliary fuel pump;

receiving, at the electronic control circuit, a signal from the pressure sensor corresponding to the output pressure measured by the pressure sensor at the output of the auxiliary fuel pump;

communicating, via a processing device associated with the electronic control circuit, an operational motor speed to the auxiliary fuel pump based on the signal received from the pressure sensor;

continuously adjusting, via the processing device, the operational motor speed based on the signal received from the pressure sensor to maintain a predetermined constant output pressure; and providing, via a control panel switch, manually selectable modes of operation including a high boost mode set to a fixed voltage corresponding to the predetermined safe speed, the method further including operating the electric motor at the predetermined safe speed in response to selecting the high boost mode, wherein selecting the high boost mode bypasses the electronic control circuit.

* * * * *